United States Patent [19]

Weiant et al.

[11] 3,854,267

[45] Dec. 17, 1974

[54] GROUT COMPOSITIONS

[75] Inventors: David S. Weiant, Moorestown; William R. Velivis, Trenton; John V. Fitzgerald, Metuchen, all of N.J.

[73] Assignee: Tile Council of America, Inc., Princeton, N.J.

[22] Filed: Mar. 15, 1971

[21] Appl. No.: 124,559

[52] U.S. Cl............. 52/744, 117/121, 117/161 C, 260/17 R, 260/29.6 R, 260/29.6 S, 260/29.6 WB, 260/29.7 R, 260/29.7 S, 260/42.13, 260/42.43

[51] Int. Cl............................................. E04f 13/00

[58] Field of Search......... 260/29.6 R, 29.6 S, 17 R, 260/29.7 S, 41 A, 41 AG; 52/744

[56] References Cited
UNITED STATES PATENTS

| | | |
|---|---|---|
| 2,676,892 | 4/1954 | McLaughlin ........................ 106/86 |
| 2,978,340 | 4/1961 | Veatch et al. ........................ 106/40 |
| 2,986,544 | 5/1961 | Driscoll ........................... 260/29.7 S |
| 3,239,479 | 3/1966 | Roenicke et al................. 260/29.7 S |
| 3,493,529 | 2/1970 | Krottinger et al. ............. 260/29.6 S |
| 3,538,036 | 11/1970 | Peters et al...................... 260/29.6 S |
| 3,706,696 | 12/1972 | Bernett et al............... 260/29.6 RW |
| 3,386,223 | 6/1968 | Wegwerth ......................... 260/17 R |
| 3,714,107 | 1/1973 | Smith............................. 260/29.7 SQ |

Primary Examiner—Lucille M. Phynes

[57] ABSTRACT

Novel aqueous mortar compositions are disclosed comprising a film-forming, water resistant polymer and a water-insoluble filler characterized in that said filler comprises spherical glass. Setting and grouting of ceramic tile by these compositions are also disclosed.

24 Claims, No Drawings

GROUT COMPOSITIONS

BACKGROUND OF THE INVENTION

This invention relates to new and improved mortar compositions, which are especially suitable in grouting applications and filling the joints between ceramic tiles. This invention relates to the compositions, the method of grouting using said compositions and the installed product wherein said compositions are used to bond the individual tiles. More particularly, this is concerned with aqueous grout and thin-bed mortar compositions which comprise a film-forming, water-resistant polymer and a water-insoluble filler characterized in that said filler consists essentially of spherical glass and to the method of grouting and bonding ceramic tile, cement tile, bricks, natural stones, mineral chips, glass tessera and glass plates, employing said compositions.

Conventional mortars for setting tile consist of Portland cement, lime and sand. Water is added to this mixture to obtain workability and to take part in the hardening or curing action by means of which the cement forms a gel. These mortars are not entirely self-curing in that they tend to lose considerable water by evaporation into the surrounding atmosphere and also by absorption into the tile or masonry which is being set. If the water loss is too great, the curing action is incomplete and the mortar becomes soft and chalky. Moreover, these conventional mortars require heavy, thick and generally multiple layers to be placed before setting the tile. This entails the use of large quantities of these materials and considerable labor for mixing, placing and trowelling of such underlayers. In addition, very wet conditions must be maintained for proper hardening and bonding which leads to the troublesome operation of soaking all novitreous ceramic tile before setting and taking of considerable precautions to insure the regulation of such wet conditions during the period of curing. Another disadvantage of such mortars concerns the impracticality of using them over such substrates as gypsum wallboard or plaster.

A more recent innovation in the tile setting industry relates to the use of dry set mortar and grouts. However, these compositions generally stain badly, crack easily and develop poor strength under dry conditions. Furthermore, these materials have poor acid and chemical resistance.

The compositions described in the instant application are essentially free of the undesirable properties which are characteristic of the aforementioned mortar compositions. More specifically, they have easy to trowel non-Newtonian consistancies; they are suitable grouts for filling joints between impervious and absorptive types of ceramic tile; they are suitable for use as thinset mortars; they exhibit minimal shrinkage and they become highly water and stain resistant after a period of time.

The compositions of this invention improve upon the properties of compositions described and claimed in copending applications Ser. No. 105,068, filed Jan. 8, 1971, now U.S. Pat. No. 3,706,696 and Ser. No. 105,109, filed Jan. 8, 1971, now abandoned having a common assignee. More particularly, the present invention is concerned with the specific modification of using spherical glass as a filler material. With this novel adaptation, one obtains grout compositions that do not scratch the surface of ceramic tile glazes during installation, become advantageously hard, tend not to crack, resist shrinkage, dirt pick-up and staining, and are easy to clean.

Until now, such desirable properties were not attainable; particularly, one having an unusually small shrinkage performance and scratch-free properties.

For instance, when sand is used at a high filler level, extreme care in application is required to avoid scratching of tiles. Moreover, to prevent shrinkage in wide joints, the commonly used fillers had to be present in very large amounts with very small amounts of free water.

This invention also yields grouts which are highly stable in that a long shelf life results even when stabilizers and levels thereof that would be unsuitable by themselves are included.

SUMMARY OF THE INVENTION

Accordingly, this invention is concerned with aqueous mortar compositions having a viscosity[1] in the range of 10,000 cps to 4,000,000 cps which comprise a film-forming, water-resistant polymer and a water-insoluble filler characterized in that said filler consists entirely or in part of spherical glass. The aforesaid aqueous composition is preferably in the form of an emulsion; however, for purpose of this invention, suspensions, dispersions and partial solutions are also contemplated.

[1] The Brookfield helipath viscosity when measured at 2.5 rpm.

A preferred embodiment of the aforesaid composition relates to those wherein said polymer, in the form of a water resistant polymer emulsion having a solids content of at least 40 percent, is capable of coalescing upon the loss of water from the grouting composition. Although the mechanism by which the aforesaid coalescence takes place is not fully understood, it is distinguishable from a cross-linking mechanism as described hereinafter. It is known, however, that as the grout loses water and then hardens by coalescence of the polymer emulsion particles, there is formed a grout which is substantially more stain resistant than ordinary Portland cement type grouts.

The improved grouting compositions which incorporate these coalescent-type polymers, using as aqueous emulsions, have a viscosity of 50,000 to 4,000,000 cps, a water retention value of from about 10 to 40, a nonvolatile solids content of 75 to 88 percent and a volatile component content of from 8 to 20 percent which comprises an admixture of a water-resistant polymer emulsion, having a solids content of at least 40 percent with the maximum content not in excess of about 75 percent and a water insoluble filler characterized in that said filler consists essentially of spherical glass.

Particularly preferred embodiments of the aforedescribed compositions are those in which said polymer is a film forming, water dispersible, room temperature crosslinkable polymer and the cross-linking process is assisted by the addition of a cross-linking agent or a catalyst. When an acidic catalyst is utilized, it is further preferred to include an activating agent.

Preferred amounts of each component are as follows: It is understood, however, that components A, B and F are essential components whereas the inclusion of C, D and E are preferred embodiments.

| | |
|---|---|
| A. Water-dispersible, cross- | 2–16% by weight |

|   | -Continued | |
|---|---|---|
|   | linkable polymer | |
| B | Water-insoluble filler (spherical glass) | 50–90% by weight |
| C. | Acidic catalyst | 0.03–2.0% by weight |
| D. | Activating agent | catalytic amounts |
| E. | Cross-linking agent | an amount sufficient to permit substantial cross-linking (at least a stoichiometric equivalent amount |
| F. | Water | 8–15% by weight |

The present invention is also concerned with the method of setting and grouting tile using the aforesaid compositions and to the articles of construction comprising tiles bonded to a support wherein the spaces between the tiles and/or the bonding material between the tiles and support consist of the compositions herein described.

DETAILED DESCRIPTION OF THE INVENTION

The novel mortar compositions of this invention are highly effective for grouting or filling joints between ceramic tiles and for adhering these tiles to various backings. The grout and mortar products resulting from the use of these compositions are especially desirable because they are resistant to water, chemicals (acid and solvent), and U.V. light and, in addition, are stain resistant and have excellent wet characteristics. Moreover, they are easy to apply.

The novel mortar compositions of this invention principally comprise:

a. a coalescence type polymer or a film-forming water-dispersible, room temperature cross-linkable polymer; and b. filler; and c. water in the following preferred amounts:

a. 2–16 percent by weight b. 50–90 percent by weight (at least 2 percent by weight of spherical glass)

c. 8–15 percent by weight

The first essential component of the herein disclosed novel composition is the polymer. When the polymer (a) is of the type capable of coalescing upon the loss of water from the grouting composition, it can be prepared by emulsion polymerization which proceeds by a free radical mechanism. The monomers are ethylenically unsaturated compounds represented by the following general formula.

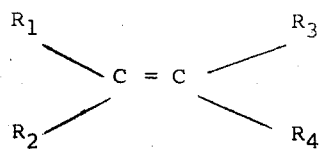

wherein $R_1$, $R_2$, $R_3$ and $R_4$ may be hydrogen, halogen, alkyl, aryl, alkylene and the like. In most instances at least two hydrogen atoms are linked directly to the ethylenic carbon atoms and in true vinyl monomers $R_1$, $R_2$ and $R_3$ are all hydrogen.

Vinyl acetate, vinyl chloride, acrylonitrile, vinylidene chloride, styrene, butadiene, alkyl acrylate, alkyl methacrylate, alkyl maleate and alkyl fumarate among others are illustrative of monomers from which water resistant polymer emulsions found useful in the present invention have been prepared.

The resulting polymers may be homopolymeric or copolymeric. They may be straight chained or branched. The present invention contemplates polymers obtained from the aforesaid monomers, mixtures and derivatives thereof.

The following list of polymers suitable for use herein is only representative of the many kinds which find application:

polyvinyl acetate
polyvinyl chloride
polystyrene
polybutadiene
polymethyl acrylate
styrene-dimethyl maleate copolymer
styrene-dimethyl fumarate copolymer
styrene-butadiene copolymer
butadiene-maleic anhydride copolymer
methylmethacrylate - acrylic acid copolymer
ethyl acrylate - methacrylic acid copolymer
vinyl chloride - ethyl acrylate copolymer
vinyl chloride - acrylic acid copolymer
ethylacrylate - acrylic acid copolymer
methylmethacrylate - acrylic acid copolymer
styrene - diethylmaleate copolymer
vinyl chloride - butylacrylate copolymer
methylmethacrylate - ethylacrylate copolymer
styrene - ethyl acrylate copolymer
vinyl chloride-2-ethylhexyl acrylate copolymer
vinyl acetate - dioctyl fumarate copolymer
acrylonitrile - butadiene copolymer
vinyl acetate - diethyl maleate copolymer When reference is made to the term alkyl, lower alkyl is preferred, i.e., alkyl containing from 1 to 4 carbon atoms.

The polymers are usually added to the herein disclosed composition in emulsion form. Hence, the water in the polymer emulsion will go to make up partially or all of the volatile components content of 8–20 percent by weight.

When a polyhydric alcohol is included, that material shall provide a portion of the volatile component content. That is to say, the aforesaid alcohols are considered as volatile components as defined herein. It is further understood that if a polyhydric alcohol is included, the calculation of the aforesaid range of 8–20 percent is based on the amount of water and alcohol (if any). Illustrative of the polyhydric alcohols are ethylene glycol, hexylene glycol, glycerin, propylene, glycol, hexitols, sorbitol and mannitol among others, as well as sodium ethyl phosphate, invert sugar and substituted ureas among others. Such materials may be employed in concentrations ranging from 5 to 30 percent by weight of the water resistant polymer emulsion. It is preferred to employ a concentration of from about 10 to 25 percent.

Generally, the water resistant polymer emulsions useful in the present invention may be characterized as those emulsions which when admixed with a filler having the physical characteristics herein set forth results in a composition having a viscosity of 50,000 to 4,000,000 cps and a water retention value of 10 to 40.

The second type of polymer must be capable of cross-linking or curing at room temperature when combined with the other ingredients which make up the entire aqueous composition. One novel aspect, therefore, is its ability to undergo at least preliminary cross-linking under the conditions of typical grout application; namely, in the presence of water and at room temperature. This initial cross-linking of polymer occurs without the usual drying and heating techniques that are normally used when polymer emulsions are used to manufacture nonwoven fabrics. The cross-linking process is then brought to completion, preferably, by the addition or promotion of a catalyst or cross-linking agent. However, after a reasonable period of time, the mortar will set to provide a grout even without the cross-linking agent or catalyst.

Although the mechanism by which the initial cross-linking occurs is not fully understood at the present time, its occurrence is highly unexpected and unusual particularly in light of the operating conditions; the polymer begins to cross-link at room temperature when combined with the other ingredients while in an aqueous environment. Cross-linking is effective once the grouting composition is dried. This initial phase in the overall formation of a highly useful end product is not only unexpected but results in a product which exhibits unusual properties.

A preferred aspect of this invention which relates to the aforedescribed cross-linking process concerns the utilization of a cross-linking aid. This aid can either be a cross-linking agent or a catalyst which accelerates and assists in promoting the cross-linking process to its desired end.

Whether one uses a catalyst or a cross-linking agent depends on the particular polymer used. For instance, to cross-link certain polymers, a cross-linking agent or hardening agent is preferred. A typical example is an epoxy resin. Resins of this type are usually cross-linked by the addition of an amine. Another example of a polymer which can be cross-linked by the addition of a cross-linking agent are certain polyester resins; namely, unsaturated polyester resins where the cross-linking occurs at the unsaturated segments of the polymer chains. In this latter type, the cross-linking agent is a monomer such as styrene, methylmethacrylate, vinyltoluene or diallyl phthalate. In addition to unsaturated polyesters, other polymeric materials can be cross-linked in the same way; namely, by copolymerization of the alkene linkage in the polymer with a monomer of the type shown above. These include: 1,4-poly-1,3-dienes, polyolefins and polysiloxanes.

In an analogous fashion, diene monomers can be used as curing or cross-linking agents in order to obtain a cross-linked structure in the final product. Examples of this type are:

methylmethacrylate-ethylene glycol dimethacrylate
vinylacetate-divinyl adipate
styrene-divinyl benzene
methylmethacrylate-allyl methacrylate.

Another cross-linking agent which falls within that term as defined herein is sulfur. Cross-linking of diene polymers such as isoprene butadiene and chloroprene and copolymers such as butadiene-acrylonitrile, butadiene-styrene and isoprene-isobutylene can be accomplished by the use of sulfur as curing agent. The resulting polymers are contemplated by this invention.

Further, polyurethane resins can be cross-linked by diols and diamines. These latter materials are similarly included within the scope of the term cross-linking agent.

The aforesaid cross-linking process is, therefore, the result of an interreaction between reactive groups on the polymer chains accomplished by the addition of a cross-linking or curing agent. This can be shown as follows:

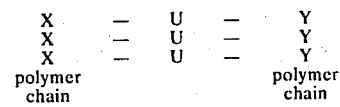

wherein X is a pendant, reactive group on the polymer chain, Y is the same as X or different and U is the cross-linking agent. Of course, the resulting molecule can be 3-dimensional. If the polymers are different, obviously X and Y will be different. This possibility is within the realm of this invention. In the specific case of epoxy resins, the polymer chain substituents are epoxy substituents

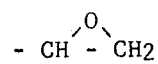

and U is an amine. Applicable cross-linking agents in addition to amines and monomers referred to above, include diols, diepoxides, dicarboxylic acids, N-methylolamides, α-olefin acids, polyvalent metal oxides, hydroxides, methylols, etc. The above list is by no means limiting and simply serves to illustrate representative examples. Any cross-linking agent known in the art of polymerization is contemplated by this invention. The only required characteristic is that it is capable of causing interreaction between the polymer chains and, more particularly, within the functional groups thereon to permit the formation of a chemical bond.

It must be understood that the particular cross-linking agent selected depends to a great extent on the particular polymer utilized. More specifically, it depends on the type of pendant groups which appear on the polymer backbond. For instance, with epoxy resins, amines are the preferred agents for attaining substantial cross-linking.

In the situation where a catalyst is used to assist in the cross-linking process, the polymer is of the type which contains substituents capable of interacting with pendant substituents, which can be the same or different, on other present polymer molecules. If the polymer chains are similar, the substituents will be the same — the converse is also true. Both situations are contemplated by this invention. When cross-linking is accelerated by a catalyst, the interaction is between the substituents directly.

The catalyst material of this invention is preferably an acidic catalyst and, in particular, inorganic and organic salts, organic acids and amine acid-addition salts. Specific examples include ammonium chloride, magnesium chloride, ammonium sulfate, ammonium bromide, ammonium thiocyanate, dichloroacetic acid, p-toluene sulfonic acid, citric acid, oxalic acid, sulfamic acid and 2-methyl-2-aminopropanol-1-hydrochloride. When the catalyst is an acidic catalyst of the type just described, it is sometimes desirable to include an activating agent to accelerate setting. A typical activating agent is formaldehyde; however, those known in the art of polymerization are within the purview of this invention. The amount of said activating agent will generally, be in catalytic quantities.

However, depending on the particular polymer utilized, the catalyst material can be different from the acidic catalyst defined above.

For instance, it can be a peroxidic material; polyurethane resins can be cross-linked by using peroxides; and polyethylene, ethylene-propylene copolymers and polysiloxanes are cross-linked by using a peroxide such as dicumyl peroxide or di-t-butyl peroxide.

Another illustrative catalyst material encompassed by the present invention is atmospheric oxygen which effectively cross-links unsaturated polyesters (alkyds) usually in the presence of metal ions (cobalt, manganese, iron, lead and zinc) in the form of carboxylic acid salts.

Another suitable catalyst for certain polymers is radiating light. Radiation effectively cross-links polyethylene and ethylene copolymers.

It is apparent from the above discussion that the polymer backbone is not critical - it may be homopolymeric, copolymeric or mixtures thereof. The polymer may be an addition polymer as illustrated by polyolefins, polyvinyl compounds, polyepoxides and polyacetals or the polymer may be of the condensation type as represented by polyesters and polyamides. Furthermore, for purposes of this invention, the particular polymer structure is not critical - it includes, therefore, polymers which are trans, cis, isotactic, syndiotactic, tritactic, atactic and all other possibilities.

The copolymer type may be random, alternating or block. Graft copolymers are also contemplated. Still further, terpolymers are within the scope of this invention.

Accordingly, the critical feature of the polymer is the substituents which are contained thereon. More particularly, the polymers must contain substituents which allow the polymer to undergo an initial cross-linking which continues to substantial completion. Hence, the polymer must be film-forming; it must be water-dispersible; and it must be capable of curing at room temperatures while in thea aqueous state.

The substituents which are formed on the polymer backbone and which are capable of providing a polymer having the necessary properties defined above are numerous and the following is only a representative listing:

  epoxy

| | |
|---|---|
| —OH | hydroxy |
| —Cl | halogen |
| —CH$_2$OH | methylol |
| —CONH$_2$ (NHR, NR$_2$) | amido |
| —COOH | carboxy |
| —COOR | ester |
| —CH=CH$_2$ | α-olefin |

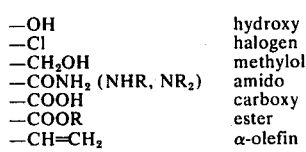 allyl carbamate

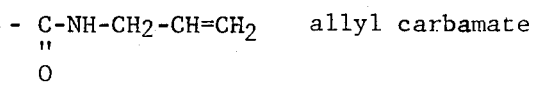 methylol acrylamide

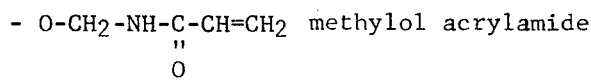 amino

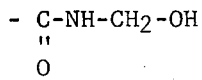 N-methylol amide

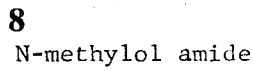 internal double bond wherein R is normally alkyl.

The above shown examples are not limiting; rather, only representative of the many possible substituents which are capable of imparting the desired properties to the polymers applicable for purposes of this invention.

Polymers which contains substituents of the type exemplified above include:
urea-formaldehyde resins
melamine-formaldehyde resins
polysiloxanes
phenolic resins
polyamides
polyesters
polyurethanes
polyacrylates
epoxy resins
polyacetals
polyacrylonitrile
polyalkyl methacrylates
polyalkyl acrylates
polyvinyl alcohol esters
polyvinylidene chloride
polyolefins The molecular weight range of the polymers used in the herein disclosed novel compositions can vary from 500 to one million depending on the particular polymer. For purposes of this invention, the preferred polymers are those which are either commercially available or easily synthesized using well-documented techniques. The molecular weight is not the deciding parameter insofar as the inventive aspect is concerned. Rather, as explained above, it is the ability of the polymer having certain reactive substituents to undergo cross-linking at room temperature under aqueous conditions to provide a highly effective grouting composition.

The aqueous compositions when all the components are combined are usually in an emulsion state. In fact, the polymer used herein typically exists in an emulsion and is usually commercially available in that particular state. Although an emulsion is most preferred, it is also possible to have a dispersion, suspension or partial aqueous solution.

A partial aqueous solution exists when a portion of the polymer molecule is water soluble or when the cross-linking agent is water soluble.

It is important to recognize that when cross-linking begins and during its progression, water is present. This is an unusual property for acid catalyzed polymerization.

It should be recognized also that the aqueous composition of this invention can provide effective grouting compositions despite the omission of a cross-linking agent or catalyst. However, the rate of interraction and, more specifically, cross-linking, is slower under such conditions and, therefore, although operable, is less preferred. It is therefore advantageous to include a cross-linking agent or catalyst to accelerate the rate of curing. Accordingly, their inclusion constitute the preferred embodiments of this invention.

The second principal ingredient which characterizes the novel aqueous compositions of this invention is the spherical glass, water insoluble filler. The preferred particle size range for the spherical glass filler is from about 2 to about 500 microns.

In addition to spherical glass, the filler may contain other filler type materials. Of course, to obtain the particular advantages of this invention, spherical glass must be included in the filler component in amounts to provide at least 2 percent by weight of the total filler material. Even more preferred is the range from 3 percent to about 8 percent by weight. Of course, the filler may consist solely of spherical glass. In this latter instance, said glass will comprise up to 90 percent by weight of the total composition.

These other fillers which may be employed in combination with spherical glass include: crushed glass, quartz, silica, barytes, limestone, alumina, various clays, diatomaceous earth and other like inert materials, wollastonite, mica, flint powder, kryolite, alumina trihydrate, talc, sand, pyrophyllite, blanc fixe, granulated polyethylene, zinc oxide and mixtures thereof.

The amount of spherical glass filler added is in the range from 2 to 90 percent by weight of the total composition.

The crosslinkable polymer compositions of this invention may also contain a water-soluble, water-retentive agent such as methylcellulose, hydroxyethylcellulose, ethylcellulose and carboxymethyl hydroxyethylcellulose. The amount added is not critical. Since such materials are known to be useful in preparing grouting compositions, the additive amounts are known to those who work in this art. These materials assist in controlling thixotrophy and viscosity characteristics.

In addition, there may also be added to either type of compositions other ingredients which are generally used in preparing mortar and grouting compositions. For instance, coloring agents, stabilizers, foam breakers, dispersants, wetting agents, emulsifiers, fungicides and the like may be included. Illustrative of coloring materials which may be added are titanium dioxide, cadmium red, carbon black, aluminum powder and the like.

The present invention is also concerned with the application of the herein disclosed compositions in setting and grouting tile.

By the term "method of grouting tile," is meant the art recognized procedure for setting and grouting tile. The compositions of this invention are particularly adapted for use as trowellable grouts or mortars to set ceramic tiles and to fill the joints between the tiles. They bond exceedingly well to the ceramic tile edges and to the backs of ceramic tile. In grouting, an assembly containing a plurality of ceramic tile in edge to edge relationship with spaces between the tiles is prepared and the spaces between the tile filler with the compositions of this invention. When used to set and grout ceramic tile, the compositions form a hard, adherent, chemically resistant bond between the backs of said ceramic tile and the substrate.

Normal grouting comprises the steps of:
1. trowelling the grout on the wall and into the joints between the tiles;
2. washing excess material from the tile faces;
3. (optional) tooling the joints to obtain the final general contour desired;
4. rewashing the wall and shaping the joints as desired with a sponge or similar soft pad; and
5. wiping the tile clean with a dry cloth or similar material after the remaining residue dried on the tile face.

Additionally, this invention is concerned with the article of construction consisting of the ceramic tile product comprising ceramic tile in which the spaces therebetween are grouted with the herein disclosed compositions.

The following examples are provided for illustrative purposes and may include particular features of the invention. However, the examples should not be construed as limiting the invention, many variations of which are possible without departing from the spirit or scope thereof.

EXAMPLE I

A mixture of a typical tile grout was made up based on the following components:

| | Component | Percentage |
|---|---|---|
| 1. | Acrylic Emulsion 33* (solids content 46 %) | 22.20 |
| 2. | Ethylene glycol | 3.13 |
| 3. | Potassium tripolyphosphate | 0.10 |
| 4. | Asbestos | 0.80 |
| 5. | Antifoam | 0.10 |
| 6. | Rutile titanium dioxide | 3.20 |
| 7. | −325 mesh silica | 21.80 |
| 8. | Limestone | 20.00 |
| 9. | Alumina trihydrate | 28.40 |
| 10. | Phenylmercurial fungicide | 0.25 |
| 11. | Defoamer | 0.02 |
| | | 100.00 |

* Rhoplex AC-33 is an acrylic latex polymer emulsion based on a major amount of ethyl acrylate and a minor amount of methyl methacrylate in proportions to provide a glass transition temperature of 12°C. Rhoplex AC-33 is obtained from the Rohm and Haas Company, Philadelphia, Pennsylvania.

This batch was finished with a viscosity of 420,000 cps and a specific gravity of 1.84.

EXAMPLE II

To 1,080 gram portions of the tile grout in Example I was added 120 grams of the following fillers:
a. 120 grams of (50 micron particle size) spherical glass shot.
b. 120 grams of Alumina trihydrate (50 micron particle size)
c. 120 grams of 325 mesh silica.
d. 120 grams of snowflake limestone (5 micron particle size)
e. 120 grams of talc.

Each material was thoroughly mixed into the tile grout of Example I and the grout was desired. Viscosity measurements were made using a Brookfield T bar viscometer spindles designated TD and TE and the helipath at 25°C and 2.5 rpm.

Viscosities were as follows:
a. 600,000 cps.
b. 4,000,000 cps.
c. 3,400,000 cps.
d. 1,200,000 cps.
e. Not measurable - grout had turned to a powder.

This data clearly demonstrates the advantage of the spherical glass filler (a). This grout could be moved over the face of the tile into the tile joints with no effort relative to (b) and (c) which could be used only with difficulty.

EXAMPLE III

The tile grouts (a), (b) and (d) prepared in Example II were used to grout a tile panel made up using Interpace square edged ceramic tile, set with a typical tile setting adhesive. The tile was spaced to a wide 0.1875 inch joint.

Results are as follows:
a. slight shrinkage
b. bad shrinkage
c. very bad shrinkage.

These results show better resistance to shrinkage with the spherical glass composition.

EXAMPLE IV

Because of the very low viscosity of the formulations containing spherical glass shot, extra filler can be added to these formulations allowing for higher loading.

A comparison between a grout loaded with extra spherical glass and another filler (aluminum trihydrate) at equivalent viscosities was made with respect to the degree of loading and recorded. The results are as follows:

A. 1080 grams of tile grout of the formula in Example I; 500 grams of spherical glass shot (50 microns particle size). Viscosity of 3,200,000.

B. 1080 grams of tile grout of Example I and 120 grams of alumina trihydrate (50 microns particle size). Viscosity of 3,400,000 cps.

These grouts were put in a ¼ × 178 inch joint between 3 × 3 × 4 ½ inches quarry tile. The A sample demonstrated no cracking. The B sample demonstrated horrendous cracking described in detail as follows: Cracks exist that range from 4 to 10 mm in length and 0.025 mm to 1 mm in width. An average of five cracks of various sizes exist per 100 mm² of grout area. The ability of a typical grout formulation to be loaded with five times as much as an equivalent particle size material and obtain the same viscosity consitutes a marked advantage in the manufacture of a grout to fill wide joints.

EXAMPLE V

A mixture of a typical tile grout was made up based on the following components:

| | Component | Percentage |
|---|---|---|
| 1. | Styrene Butadiene copolymer aqueous emulsion | 14.1242 |
| 2. | Water | 2.8248 |
| 3. | Potassium tripolyphosphate | 0.0706 |
| 4. | Emulsion stabilizer | 0.0706 |
| 5. | Antifoam | 0.0706 |
| 6. | Limestone (5 micron particle size) | 14.1242 |
| 7. | Limestone (40 micron particle size) | 68.5032 |
| 8. | Defoamer | 0.2118 |
| | | 100.0000 |

This batch was finished with a viscosity of 224,000 cps and a specific gravity of 1.9047. It was applied to joints between 4 ¼ 33 4 ¼ in. glazed wall tiles where it hardened over night.

EXAMPLE VI

To 270 gram portions of the tile grout in Example V was added 30 grams of the following fillers:

a. 30 grams alumina trihydrate (50 micron particle size)
b. 30 grams (50 micron particle size) spherical glass shot.

Each material was thoroughly mixed into the tile grout of example V and deaired. Viscosity measurements were made using a Brookfield T bar viscometer, spindles designated td and tf and helipath travel at 25°C. and 2.5 rpm.

Viscosities were as follows:
a. 3,820,000 cps.
b. 440,000 cps.

This data clearly demonstrates the advantage of using the spherical glass filler. The grout prepared using (b) could be squeezed over the face of the tile into the joints with no effort relative in comparison to (a), the alumina trihydrate-containing grout, which could be used, but only with difficulty.

EXAMPLE VII

The procedure of Example II is repeated wherein the following coalescent-type polymers (in aqueous suspenions) in equivalent amounts are used in lieu of AC–33:
styrene-diethylmaleate copolymer
styrene-dimethylmaleate copolymer
vinylchloride-ethylacrylate copolymer
vinylchloride-butylacrylate copolymer
methylmethacrylate-ethylacrylate copolymer
stryrene-ethyl acrylate copolymer
vinylchloride-2-ethylhexyl acrylate copolymer
vinylacetate-dioctyl fumarate copolymer
acrylonitrile-butadiene copolymer
vinyl acetate-diethyl maleate copolymer
Similar results are obtained.

EXAMPLE VIII

A mixture of a typical tile grout was made up based on the following components:

| | Component | Percentage |
|---|---|---|
| 1. | Acrylic Emulsion (AC-33) | 20.03 |
| 2. | Ethylene Glycol | 2.82 |
| 3. | Rutile Titanium Dioxide | 3.17 |
| 4. | Potassium Tripolyphosphate | 0.10 |
| 5. | Antifoam | 0.10 |
| 6. | Limestone | 19.50 |
| 7. | 325 Mesh Silica | 21.30 |
| 8. | Carbopol 934 (Stabilizer) | 0.01 |
| 9. | Alumina Trihydrate | 27.72 |
| 10. | Spherical Glass Shot (100 Particle Size) | 5.00 |
| 11. | Phenymercuric Fungicids | 0.23 |
| 12. | Defoamer | 0.02 |
| | | 100.00 |

The batch was finished with a viscosity of 230,000 cps and a specific gravity of 1.80.

When a stabilizer was added, storage life was extended. However, the stabilizer increased the tendency of the grout to shrink. When an increased amount of one of the fillers (other than spherical glass) was added, no decrease of shrinkage tendencies was observed, and the viscosity of the mix increased to the point where the grout became difficult to use and showed poor storage life. With the addition of only 5 percent glass beads, however, extended storage life continued to be observed, shrinkage was obliterated and troweling the mix was accomplished with more ease than other formulations modified to avoid shrinkage.

While it appears that the glass acts as a stabilizer, its role is more subtle. It is believed that the glass reduces shrinkage, making it possible to use stabilizers that would otherwise be unsuitable. Sand reduces shrinkage but cannot be used because it scratches tile glazes.

EXAMPLE IX

A mixture of a typical tile grout was made up based on the following components:

| | Component | Percentage |
|---|---|---|
| 1. | Acrylic Emulsion (AC-33) | 17.80 |
| 2. | Emulsion Stabilizer | 0.36 |
| 3. | Potassium tripolyphosphate | 0.08 |
| 4. | Ethylene Glycol | 2.51 |
| 5. | Methylcellulose 15,000 cps. viscosity | 0.02 |
| 6. | Antifoam | 0.08 |
| 7. | Rutile Titanium dioxide | 2.61 |
| 8. | Spherical Glass (44–5 micron Size) | 16.06 |
| 9. | 325 Mesh Silica | 17.33 |
| 10. | Spherical Glass (74–44 Micron Size) | 22.79 |
| 11. | Spherical Glass (149–74 Micron Size) | 19.94 |
| 12. | Phenylmercurial Fungicide | 0.20 |
| 13. | Defoamer | 0.02 |
| | | 100.00 |

This batch was finished with a viscosity of 240,000 cps. This composition having a filler loading increase of 5 percent over that of Example I and the filler comprising solely spherical glass has a viscosity nearly one half of the composition of Example I. The trowellability of this formulation is found to be much better than that of Example I.

EXAMPLE X

Samples of the composition of Example VIII were modified with larger particle size spherical glass and some were modified with sand for comparison. An example of a naturally occurring spherical sand (Ottowa) was also evaluated. Results of these tests are as follows:

A Mix.
1051.0 grams of tile grout based on the formula in Example VIII were mixed with 397 grams of 149 micron – 53 micron spherical glass.

B Mix.
1051.0 grams of tile grout based on the formula in Example VII were mixed with 397 grams of 150 micron –74 micron spherical glass.

C Mix.
1051.0 grams of tile grout based on the formula in Example VIII were mixed with 397 grams — 250 micron to 149 micron spherical glass.

D Mix.
1051.0 grams of a tile grout based on the formula in Example VIII were mixed with 397 grams of a 149 micron to 53 micron (whitehead Superior) sand.

E Mix.
1051.0 grams of a tile grout based on the formula in Example VIII were mixed with 397 grams of a 250 microns to 149 micron sand (Whitehead A).

F Mix.
1051.0 grams of a tile grout based on the formula in Example VIII were mixed with 397 grams of a round Ottowa sand of about 500 microns particle size.

The tabulated results are as follows:

A Mix.
Viscosity of 360,000 cps. No scratching with the standard use of a steel trowel on glazed wall tile.

B Mix.
Viscosity of 372,000 cps. No scratching with the standard use of a steel trowel on glazed wall tile.

C Mix.
Viscosity of 188,000 cps. No scratching with the standard use of a steel trowel on glazed wall tile.

D Mix.
Viscosity of 188,000 cps. Scratching on glazed wall tile.

E Mix.
Viscosity of 225,000 cps. Severe scratching on glazed wall tile.

F Mix.
Viscosity of 180,000 cps. Severe scratching on glazed wall tile.

EXAMPLE XI

A mixture of a typical tile grout was made up based on the following components:

| | Components | Percentage |
|---|---|---|
| 1. | Acrylic emulsion A 46% solids* | 14.7793 |
| 2. | Acrylic emulsion B 60% Solids** | 14.7793 |
| 3. | Ammonium Hydroxide | 0.0303 |
| 4. | 325 Mesh Silica | 25.3414 |
| 5. | Methylcellulose 15,000 cps. viscosity | 0.0265 |
| 6. | Potassium tripolyphosphate | 0.1291 |
| 7. | Antifoam | 0.1291 |
| 8. | 5 Micron Silica | 11.5784 |
| 9. | Alumina trihydrate | 32.8971 |
| 10. | Phenylmercurial Fungicide | 0.2839 |
| 11. | Defoamer | 0.0256 |
| | | 100.0000 |

\* Thermosetting acrylic polymer emulsion with functional methylol acrylamide - acid crosslinkable - groups, 45% solids, viscosity 30 to 200 cps., pH of 8.5–9.5, surface tension of 46 dynes per cm., and capable of forming flexible films, with a modulus of E=6.5 × 10³ psi. after drying and then baking at 350°F. for 30 minutes. An example of this general type of polymer in Rhoplex E172, supplied by Rhom and Haas Company, Independence Mall West, Philadelphia, Pennsylvania 19105.

\*\* Thermosetting acrylic emulsion polymer, with functional acid-crosslinkable grouts, 60% solids, viscosity 40 to 120 cps. A commercial brand of this polymer that was found to work was E-660 obtained from Rohm and Haas.

This batch was finished with a viscosity of 44,000 cps.

EXAMPLE XII

To portions of the tile grout in Example XI was added the following amounts of colored glass beads:

| | | | |
|---|---|---|---|
| 1. | Red Glass Beads | 10% | 26% |
| b. | Blue Glass Beads | 23% | 29% |
| c. | Yellow Glass Beads | 23% | 29% |
| d. | Green Glass Beads | 16.6% | |

Each material was thoroughly mixed into the tile grout of Example XI and deaired.

EXAMPLE XIII

The tile grouts prepared in Example XII were used to grout a tile panel made up using a combination of Interpace and Pamona square edged ceramic tile, wet with a typical tile setting adhesive. Ability of colored glass beads to color a grout was observed.

Results are as follows:
a. 10% Red glass beads, . . . resulting color of grout . . . acceptable.
   26 percent Red glass beads . . . resulting color of grout . . . exceptional deep red color.
b. 23 percent Blue glass beads . . . resulting color of grout . . . acceptable.
   29 percent Blue glass beads . . . resulting color of grout . . . acceptable.
c. 23 percent Yellow glass beads . . . resulting color of grout . . . acceptable.
   29 percent Yellow glass beads . . . resulting color of grout . . . acceptable.
d. 16.6 percent Green glass beads . . . resulting color of grout. . . acceptable.

The above data clearly demonstrates that colored glass beads present an easy to use coloring system for tile grout compositions.

EXAMPLE XIV

A mixture is prepared containing the following components:

| | Component | Percentage | Amount |
|---|---|---|---|
| 1. | Acrylic polymer A* | 16.8675 | 1349.40 grams |
| 2. | Acrylic polymer B* | 4.2170 | 337.36 grams |
| 3. | Silica (96% through 325 mesh) | 20.7608 | 1660.86 grams |
| 4. | Silica 5 Micron Average Particle Size | 9.4906 | 759.25 grams |
| 5. | Spherical Glass 74–149 Microns particle Size Range | 9.4906 | 759.25 grams |
| 6. | Spherical Glass 44–5 Microns Particle size range | 9.4906 | 759.25 grams |
| 7. | Titanium dioxide | 2.2252 | 178.02 grams |
| 8. | Potassium tripolyphosphate | .1077 | 8.62 grams |
| 9. | Methyl cellulose 15,000 cps. viscosity | .0215 | 1.72 grams |
| 10. | Antifoam agent | .1077 | 8.62 grams |
| 11. | Powdered Alumina Trihydrate | 26.9621 | 2156.97 grams |
| 12. | Fungicide | .2372 | 18.98 grams |
| 13. | Antifoam | .0215 | 1.72 grams |
| | | 100.0000% | 8000.02 grams |

*Thermosetting acrylic polymer emulsion with functional methylol acrylamide - acid crosslinkable - groups, 45% solids, viscosity 30 to 200 cps, pH of 8.5–9.5, surface tension of 46 dynes per cm., and capable of forming flexible films, with a modulus of $E=6.5 \times 10^3$ psi. after drying and then baking at 350°F for 30 minutes. An example of this general type of polymer that worked is Rhoplex E172, supplied by Rohm and Haas Company, Independence Mall West, Philadelphia, Pennsylvania 19105.

**Thermosetting acrylic emulsion polymer with functional acid crosslinkable grouts, 60% solids, viscosity 40 to 120 cps. A commercial brand of this polymer that was found to work was E-660 obtained from Rohm and Haas Company.

The above composition is prepared by mixing the components in a high speed mixer. The resulting product has a viscosity of 120,000 cps. and a specific gravity of 1:84. It contains about 10 percent by weight total water.

Shelf stability of these formulations is noted to be exceedingly good. Even after nine months, no change is detected in stored samples. This product is suitable for use as a tile mortar and tile grout. For instance, a portion of this formulation was used to grout a panel of wall tile. The next day, the grout was hard and gave the appearance of a typical tile grout.

To 200 grams of the formulation described above was added 1 gram of ammonium chloride catalyst. The resulting material was used to grout a panel of glazed wall tile. On the following day, the grout was harder than the uncatalyzed grout and more difficult to dig out by fingernail.

After 21 days the catalyzed grout was more stain and water resistant than the 21 day old uncatalyzed grout and extremely hard.

EXAMPLE XV

To 400 gram amounts of the formulation described in Example XIV is added the following amounts of ammonium chloride catalyst. The samples are then tested by a Gilmore needle according to ASTM C266, for their setting time in a 100 percent humidity cabinet. The following results were obtained:

| Crosslinking Grout/ Ammonium Chloride | Initial Setting Time |
|---|---|
| 1. 400 grams/1 gram | 12 hrs. 36 min. |
| 2. 400 grams/2 grams | 8 hrs. 34 min. |
| 3. 400 grams/3 grams | 3 hrs. 54 min. |
| 4. 400 grams/4 grams | Stiffened while mixing |

The above described experiment substantiates that practical setting times are obtainable under humid conditions where the herein disclosed compositions are used.

Setting time capacity is very advantageous to the installation of tile. In the case of grout application, the catalyzed grout firms in the joint allowing the surface to be wiped clear of smears. In the case of adhering tile, the catalyzed mortar (grout) firms up, securing the tile so that they can be grouted almost immediately without dislodgement of tiles.

EXAMPLE XVI

The procedure of Example XV is repeated except that catalytic amounts of formaldehyde were added to each of the catalyzed compositions. In each instance, the setting time was decreased substantially. The 400 grams of the composition of Example XIV, 10 grams of formalin 37 percent solution were added. Then 3 grams of ammonium chloride were added to catalyze the composition. The fast set time of 25 minutes was obtained.

EXAMPLE XVII

A 400 gram sample of the grout composition prepared according to the procedure of Example XIV was mixed with 2 grams of 12.5 percent sulfamic acid water solution. The set time under 100 percent humidity was even shorter than was obtained with the ammonium chloride. Sulfamic acid was found to be a suitable catalyst.

EXAMPLE XVIII

The composition prepared according to Example XVII is used as a grouting composition in the following manner:

1. The grout is trowelled on the wall and into the joints between the tiles;
2. The excess material is washed from the tile faces;
3. The joints are tooled to obtain the final general contour desired;
4. The wall is rewashed and the joints are shaped as desired with a sponge; and
5. The tile is wiped clean with a dry cloth after the remaining residue dried on the tile face.

EXAMPLE XIX

To the surface of a 4 ft. by 5 ft., 2 inch thick panel of cut-cell expanded polystyrene, impervious ceramic mosaic tiles and absorbtive dry glazed wall tiles were adhered each with each of the following three mortar compositions A, B and C. At successive time intervals attempts were made to pry-off individual tiles.

A. Mortar composition of Example XIV with no catalyst.
B. Mortar composition of Example XIV with 0.50 percent ammonium chloride.
C. Mortar composition of Example XIV with 0.75 percent ammonium chloride.

| Times After Application | Compositions Used | OBSERVATIONS Ceramic Mosaics | Wall Tiles |
| --- | --- | --- | --- |
| 2 hrs. | A | pried off easily | pried off easily |
| 2 hrs. | B | pried off easily | breaks tile |
| 2 hrs. | C | pried off easily | breaks tile |
| 7 hrs. | A | pried off easily | breaks tile |
| 7 hrs. | B | pried off easily | very tightly bonded |
| 7 hrs. | C | pried off easily | very tightly bonded |
| 24 hrs. | A | pried off easily | very tightly bonded |
| 24 hrs. | B | dif. to pry off | very tightly bonded |
| 24 hrs. | C | dif. to pry off | very tightly bonded |

From the above table the observer noted that glazed wall tiles were sufficiently bonded to the panel for grouting before two hours for the catalyzed mortar, but were not firm until 4 hours for the uncatalyzed. Ceramic mosaics were not sufficiently bonded by the catalyzed mortar to permit easy grout application until 24 hours.

Tiles were speedily set and grouted with the catalyzed composition of Example XIV on expanded polystyrene panels to form prefabricated ceramic tile surfacing units. These highly water resistant units were used over a typical tub.

EXAMPLE XX

A sample of mortar based on the formula in Example XIV was applied to an aluminum sheet 0.050 inches thick. Samples of ceramic tile, glass tile, quarry tile and wall tile were set on the sheet. The test was repeated using catalyzed grout. In all cases time when tiles could not be pried off easily was lessened by the use of catalyst. The tiles were then grouted with the same formulations.

EXAMPLE XXI

A sample of the mortar composition based upon the formula described in Example XIV was applied to a cinder block. Stones were pressed in the plastic mortar layer to form a decorative exposed aggregate surfacing. A second similar sample was prepared in the same manner except that 0.75 percent by weight of ammonium chloride catalyst was added to the formulation. Freshly applied stones were observed to cling better to the catalyzed mortar. The catalyzed composition demonstrated improved bonding when one attempted to pry off a 1 inch diameter stone. The rapid extra stiffening caused by catalyst addition improved the application. After 15 days, water soak test and scratch tests indicated an improved water resistant product was obtained. After 30 days the product was exceptionally hard after immersion in water for 3 days.

EXAMPLE XXII

A sample of the mortar based on the formula in Example XIV was used to bond wall tile, quarry tile and ceramic mosaic tile to wall board, cut cell styrene board, insulation block, insulation board, plywood, cement board, cardobard, composition board, cinderblock, cement block, brick and sheet aluminum. The above samples were repeated using the catalyzed mortars of Example XIV. The advantages of rapid stiffening or short set time over nonporous surfaces were noted with catalyzed mortar. When wetted, the tiles were more easily pried off the different backings when the uncatalyzed mortar had been used as the adherent.

EXAMPLE XXIII

A composition was prepared having the following formula:

| | Component | Percentage | Amount |
|---|---|---|---|
| 1. | Acrylic polymer A of Example XIV | 7.8921 | 157.8 grams |
| 2. | Acrylic polymer B of Example XIV | 1.7238 | 34.4 |
| 3. | Water | 10.7690 | 215.2 |
| 4. | Silica (96% through 325 mesh) | 21.5838 | 431.6 |
| 5. | Silica 5 Micron Average Paricle Size | 9.8658 | 197.2 |
| 6. | Spherical Glass 74–149 microns particle size range | 9.8658 | 197.2 |
| 7. | Spherical Glass 44–5 microns particle size range | 9.8658 | 197.2 |
| 8. | Titanium dioxide | 1.1364 | 20.6 |
| 9. | Potassium tripolyphosphate | 0.0550 | 1.0 |
| 10. | Methyl cellulose 15,000 cps. viscosity grade | 0.0109 | 0.2 |
| 11. | Antifoam | 0.0655 | 1.2 |
| 12. | Powdered Alumina Trihydrate | 27.0323 | 540.6 |
| 13. | Fungicide | 0.1211 | 2.4 |
| 14. | Ammonium hydroxide (stabilizer | 0.0127 | 0.2 |
| | | 100.0000% | 1996.8 grams |

The resulting composition with less binder than Example XIV has a viscosity of 16,000 cps. and a water content of about 14 percent. The composition was found to be acceptable when applied as a grout and mortar to wall tile.

EXAMPLE XXIV

A sample of the mortar prepared according to the procedure of Example XIV with ammonium chloride catalyst was used in the Grout Application Index Test. This test measures the time required to grout 22 square feet of 4 ¼ inch glazed wall tile. The grout formula of Example XIV was applied in 13.5 minutes. The time savings is significant when a high performance tile installation is wanted at low installation labor cost.

EXAMPLE XXV

A sample of the mortar based on the formula in Example XIV with catalyst was used to set and grout 1 inch ceramic mosaic tile on a dry concrete slab for testing by ASTM Method C627-70. Setting and grouting was completed after 3 hours. The floor test slab passed light performance level 20 hours after setting, indicating a rapid development of strength. Thus, tiles were installed and ready for use within 24 hours.

EXAMPLE XXVI

The following experiment was carried out to show a comparison between catalyzed and uncatalyzed grout compositions. The compositions applied as grouts between glazed wall tiles were subjected to wet abrasion tests which employ the Standard Gardner Scrub Tester. 1,000 scrub cycles in the machine gave the following results:

Grout From Examples No. XIV With 0.5% NH₄Cl catalyst (after 24 hours)    0.006 inches scrubbed off Grout From Example No. XIV With Catalyst (after 3 days)    0.000 inches scrubbed out Grout From Example No. XIV Without Catalyst (after 30 days)    0.029 inches scrubbed off Grout samples disclosed in the present invention also showed improved stain resistance.

EXAMPLE XXVII

The following test demonstrated the excellent wet shear strength exhibited by the compositions of this invention. Bonded tile assemblies of mortar based upon the composition described in Example XIV with and without catalysts were tested according to American National Standards Institute Test for Organic Adhesives ANSI 136.1, 1967. Following are results in pounds per square inch:

| | Shear bond Strength | |
|---|---|---|
| | Dry | Wet |
| Without catalyst | 508 psi | 55 psi |
| With catalyst | 510 psi | 230 psi |
| Commercial brand noncrosslinking type grout | 460 psi | 30 psi |

No commercial grouts presently available have produced a wet bond in excess of 40 psi as determined by the above test.

EXAMPLE XXVIII

A test of the grout based on the formula of Example XIV was tested in a countertop type application.

A test was devised in which various concentration food acids flowed over (a) a catalyst cured "countertop grout," formula of Example XIV, (b) commercial brand noncrosslinking grout and (c) conventional Portland cement, wet cured grout.

A pump is utilized to flow the acid solution over the crosslinking grout. The solution then flows over noncrosslinking grout and finally over the conventional, wet cured cement grout in sequence. Erosion is measured after flow over five identical previously measured sections of grout on each panel section for each chemical solution tested. Actual depth of erosion in mils after 30 hours of operation are listed in the following table:

| | | C | B | A |
|---|---|---|---|---|
| (1) | 10% acetic acid | 38.6 | 7.2 | 2.4 |
| (2) | 40% citric acid | 25.4 | 12.0 | 1.6 |

This example is cited to demonstrate the superior acid resistance of a grout based on a crosslinking resin system.

EXAMPLE XXIX

A test for the determination of resistance to solvents was developed. The test showed the improved solvent resistance of the grout formulas of this invention.

Hardened grout samples were dug out of tile joints. In the test, approximately 2 g. of the sample was weighed to the nearest 0.1 mg. and placed in a 4-ounce jar with 100 ml. of acetone.

Each of the jars were stirred 2 hours by a magnetic stirrer. The contents of the jars were then filtered through glass wool, and the filtrate collected in a tared 4-inch evaporating dish. The jar and glass wool filter were rinsed with acetone and collected in the evaporating dish.

When the filtrate in the evaporating dish was evaporated to constant weight, the percent of acetone insolubles were as follows:

$$\frac{[(\text{Weight of Grout Sample}) - (\text{Weight of Residue})] \times 100}{[\text{weight of Grout Sample}]} = \text{Percent Acetone Insolubles}$$

A sample of grout based on uncatalyzed formulation in Example XIV had an acetone insolubles of 96.59 percent. A sample of the same grout, but with 0.5% $NH_4Cl$ catalyst indicated acetone insolubles of 98.02 percent. Samples of grout based on commercial brand noncrosslinking type resin system gave acetone insolubles of 88.0 percent.

EXAMPLE XXX

The test procedure of Example XVII showed that the solvent resistance at room temperature for the catalyzed grout formula of this invention was equivalent to solvent resistance of the noncatalyzed grout that had been heat cured. All four of the following samples were aged 21 days at room temperature:

| | |
|---|---|
| No catalyst | 97.2% insoluble |
| 0.5% $NH_4Cl$ catalyst | 98.8% insoluble |
| No catalyst ½ hr. at 150°C. | 98.7% insoluble |
| 0.5% $NH_4Cl$ Catalyst ½ hr. at 150°C. | 100.0% insoluble |

EXAMPLE XXXI

The following composition demonstrated that polyvinyl acetate copolymer emulsions are applicable for preparing grouts of this invention

| | Component | Percentage | Amount | |
|---|---|---|---|---|
| 1. | P.V.Ac. Acrylic Copolymer emulsion | 19.0873 | 381.746 | grams |
| 2. | Water | 5.4225 | 108.4500 | |
| 3. | Silica (96% through 325 mesh) | 22.5189 | 108.4500 | |
| 4. | 5 Micron Silica | 7.7407 | 154.814 | |
| 5. | Spherical Glass (74–149 microns) | 7.7407 | 154.814 | |
| 6. | Spherical Glass (44–45 microns) | 7.7407 | 154.814 | |
| 7. | Titanium dioxide | 1.7813 | 35.626 | |
| 8. | Potassium tripolyphosphate | .0812 | 1.624 | |
| 9. | Methyl cellulose 15,000 cps viscosity | .0169 | 0.0338 | |
| 10. | Antifoaming agent | .0973 | 1.9012 | |
| 11. | Powdered Alumina Trihydrate (Mean particle 80 micron) | 27.5771 | 551.542 | |
| 12. | Fungicide | .1951 | 3.3449 | |
| | | 99.9997% | 1999.994 | grams |

The above grout formula was found suitable for filling the joints between glazed wall tile. The viscosity was 104,000 cps. and the specific gravity was 1.47.

The polyvinylacetate acrylic copolymer aqueous emulsion had methylol reactivity and, therefore, could be crosslinked at room temperature by addition of acid catalysts, such as, oxalic acid, ammonium thiocyanate, and ammonium chloride. Commercial brand 55 DEV, made by Frankline Chemical Company, 2020 Brush Street, Columbus, Ohio 43207, is an example of this resin exulsion.

EXAMPLE XXXII

In place of ammonium chloride in Example XV, the following acidic catalysts in the amounts shown are substituted for ammonium chloride with comparable results:

| | |
|---|---|
| ammonium bromide | 0.03% |
| ammonium thiocyanate | 0.05% |
| ammonium sulfate | 1% |
| ammonium thiocyanate | 1% |
| dichloroacetic acid | 0.03% |
| p-toluene sulfonic acid | 0.04% |
| citric acid | 2% |
| oxalic acid | 0.5% |
| sulfamic acid | 0.03% |
| 2-methyl-2-aminopropanol HCl | 0.5% |
| 1-amino-4-butanol HCl | 1% |

EXAMPLE XXXIII

The procedure of Example XIV is repeated to prepare a similar composition except the following percent by weight amounts of polymer material is used to provide suitable compositions:

| | |
|---|---|
| 2% (+15% water) | 11% (+10% water) |
| 5% (+14% water) | 14% (+13% water) |
| 7% (+13% water) | |
| 8% (+12% water) | |

EXAMPLE XXXIV

Mortars based on the formula in Examples I and XIX were colored with common latex paint store coloring systems. In all cases pigments were compatable and the mortars got hard and water resistant with catalyst. After 15 days, the colored mortars were tested for hot water softening. The catalyzed mortars softened in water at higher temperatures than uncatalyzed mortars. The degree of softening was also less. Also, a satisfactory method of coloring the mortars was to combine the pigment with the catalyst and then add to the emulsion system.

EXAMPLE XXXV

A catalyzed mortar of low viscosity based on the formula in Example XIV was added to wet Portland cement mortar. The mortar was applied to an aluminum sheet. Several pieces of tile were set in the mortar on this sheet. Also, for comparison, other tiles were set on the sheet with plain Portland cement mortar. After 24 hours aging at room temperature, the catalyzed mortar was noted to be tightly bonded.

EXAMPLE XXXVI

Another typical room temperature crosslinking polymer emulsion found suitable for producing the ceramic setting mortars of this invention was vinyl acetate copolymer latex, 45 percent solids, 0.14 micron particle size, pH 4.7, viscosity 100 cps and minimum film (brittle) forming temperature 13°C. This is a thermosetting emulsion that ordinarily is used to bind fibers into nonwoven fabrics by drying and applying high temperature. An example of this emulsion that produced a suitable mortar was X-LINK 2802 brand furnished by National Starch and Chemical Corporation, 750 Third Avenue, N.Y. 10017.

Where used to replace both emulsions 1 and 2 of the formula of Example XIV, a mortar was formed suitable for grouting and adhering ceramic tiles to gypsum wallboard and concrete masonry.

EXAMPLE XXXVII

When a self-reactive vinyl acrylic terpolymer latex, 45 percent solids, pH 4.6, viscosity 200 centipoise, average anionic particle size 0.14 micron was used in place of the vinyl acetate copolymer emulsion of Example XXXVI. A suitable mortar was obtained.

EXAMPLE XXXVIII

The following aqueous composition was prepared:

| | Component | Percentage | Amount |
|---|---|---|---|
| 1. | Polymer A of Example I | 3.7063 | 168.6720 |
| 2. | Polymer B of Example I | 0.9178 | 41.768 |
| 3. | Water | 13.9081 | 632.940 |
| 4. | Antifoaming agent | .9234 | 5.168 |
| 5. | Silica | 30.3334 | 1380.432 |
| 6. | Methyl cellulose 15,000 cps. | .0377 | 1.720 |
| 7. | Potassium tripolyphosphate | .0946 | 4.308 |
| 8. | TiO$_2$ | 1.9558 | 89.008 |
| 9. | Silica 3 microns average particle size | 8.3418 | 379.624 |
| 10. | Spherical Glass 74-149 microns particle size range | 8.3418 | 379.624 |
| 11. | Spherical Glass 44-5 microns particle size range | 8.3418 | 379.624 |
| 12. | Aluminum trihydrate | 23.6984 | 1078.484 |
| 13. | Fungicide | .2084 | 9.488 |
| | | 99.9993% | 4550.850 grams |

This is mortar containing the very low concentration of 4.6% wet or 2.5% dry of crosslinkable polymer emulsion. It is used to fill the joints between ceramic tile. It had good application consistency, cleaned up usually easily and hardened satisfactorily.

A similar usable low polymer content mortar was prepared by substituting 200 grams of hydroxymethyl derivative of diacetone acrylamide, copolymer latex, 45 percent solids, pH 4.3 for the polymers A and B above. A commercial example of this copolymer emulsion is Lubrizol 2,240, obtained from the Lubrizol Corporation, P.O. Box 3057, Cleveland, Ohio 44117.

EXAMPLE XXXIX

Thermosetting polyvinylchloride acrylic copolymer emulsions are found to produce a mortar with the good properties of this invention. Following is a complete mortar formula found suitable for filling joints (grouting) and setting (adhering ceramic tile).

| | Component | Percentage | Amount |
|---|---|---|---|
| 1. | Vinylchloride Copolymer* | 22.96 | 1836.8 grams |
| 2. | Silica (96% through 325 mesh) | 20.27 | 1621.6 |
| 3. | Silica 5 micron average | 9.26 | 740.8 |
| 4. | Spherical Glass 74-149 microns particle size range | 9.26 | 740.8 |
| 5. | Spherical Glass 44-5 microns particle size range | 9.26 | 740.8 |
| 6. | Titanium dioxide | 2.19 | 175.2 |
| 7. | Potassium tripolyphosphate | .10 | 8.0 |
| 8. | Methyl cellulose 15,000 cps viscosity | .0209 | 1.6720 |
| 9. | Antifoaming agent | .12 | 9.6 |
| 10. | Powdered Alumina Trehydrate | 26.32 | 2105.6 |
| 11. | Fungicide | .24 | 19.2 |
| | | 100.0009% | 8000.0720 grams |

EXAMPLE XL

A polymer emulsion is prepared in the following general way for use in the tile-wetting mortar of this invention.

A mixture of 85 parts vinyl acetate monomer, 12 parts of dioctyl fumarate monomer and 3 parts of methylol acrylamide is added over a 3 hour period to 50 parts of 60°F water containing 0.5 percent of a sodium salt of an alkylaryl polyether sulfonate and the initiator potassium persulfate. The batch is constantly agitated. First the mixture is heated to 70°F and held at that temperature for about an hour. Then an additional 50 parts of water containing 1.5 percent potassium persulfate is added over a 1 ½ hour period maintaining the 70°F temperature of the batch. Then the batch is held, continuing agitation, for 1 hour more at 70°F and finally allowing the temperature to rise to 80°F for one more hour. 200 grams of the crosslinkable vinyl acetate copolymer emulsion so formed is cooled, filtered and substituted for polymer ingredients A and B of Example I to form a mortar suitable for grouting and setting ceramic tiles on various substrates.

EXAMPLE XLI

The procedure of Example XIV is repeated to prepare a similar composition except instead of polymers A and B, the following polymers, in equivalent amounts, are used (in emulsion form) together with the shown catalyst or crosslinking agent:

| Polymer | Crosslinking Agent | Catalyst |
|---|---|---|
| Epoxy resin (reaction product of epichlorohydrin and Bisphenol A) | ethylene diamine | |
| polyisoprene | diallyl phthalate | |
| polymethylmethacrylate | allyl methacrylate | |
| polyurethane resin | ethylene diamine | |
| polyurethane resin | | dicumyl peroxide |
| ethylene-propylene block copolymer | | di-t-butyl peroxide |
| polysiloxane resin | | di-t-butyl peroxide |
| alkyd resin | | atmospheric oxygen |
| polyvinylidene chloride | | p-toluene sulfonic acid |
| polyacrylonitrile | | succinic acid |
| urea-formaldehyde resin | | carbonic acid |

In those instances where a crosslinking agent is used, a stoichiometric equivalent amount is added whereas with the catalysts, catalytic amounts are used.

What is claimed is:

1. A method for setting and grouting tiles in an edge-to-edge, spaced-apart relationship on a support surface, said spaces between the tiles forming joints, the improvement which comprises setting the tiles and filling the joints between the tiles with an aqueous non-hydraulic grouting composition comprising (i) 2–16 percent by weight of a polymer emulsion capable of coalescing upon the loss of water from the grouting composition and having a solids content of 40–75 percent; and (ii) 50–90 percent by weight of a water insoluble filler in which at least 2 percent thereof is spherical glass having a particle size range of from 2 to about 500 microns, said grouting composition having a viscosity of 10,000 to 4,000,000 cps, water retention value of from 10–40, and a volatile component of from 8–20 percent by weight.

2. The method according to claim 1 wherein there is included from 5 to 30 percent by weight of said polymer emulsion of a polyhydric alcohol.

3. The method according to claim 1 wherein said polyhydric alcohol is ethylene glycol.

4. The method for setting and grouting tile according to claim 1 wherein said polymer is a film-forming, water-dispersible, room temperature crosslinkable polymer.

5. A method for setting and grouting tile according to claim 4 wherein the cross-linking of said cross-linkable polymer is aided by the addition of a crosslinking agent.

6. A method for setting and grouting tile according to claim 4 wherein the cross-linking of said cross-linkable polymer is aided by the addition of an acidic catalyst present in an amount to provide from 0.03 to 2.0 percent by weight of the total aqueous composition.

7. A method according to claim 6 wherein said acidic catalyst is selected from the group consisting of inorganic and organic salts, organic acids and amine acid-addition salts.

8. A method for setting and grouting tile according to claim 4 wherein a water-soluble, water-retentive agent selected from the group consisting of methylcellulose and hydroxyethylcellulose is added to the aqueous composition.

9. The method in accordance with claim 1 wherein said spherical glass is present in a range of about 3 to 8 percent by weight.

10. The method of claim 1 wherein the tiles are ceramic tiles.

11. A tile assembly comprising
 a. a support surface,
 b. a plurality of tiles arranged in an edge-to-edge, spaced-apart relationship on the support, said spaces between the tiles forming joints, and
 c. a grouting composition comprising (i) 2–16 percent by weight of a polymer emulsion capable of coalescing upon the loss of water from the grouting composition and having a solids content of 40–75 percent; and (ii) 50–90 percent by weight of a water insoluble filler in which at least 2 percent thereof is spherical glass having a particle size range of from about 2 to about 500 microns, said grouting composition having a viscosity of 10,000 to 4,000,000 cps, a water retention value of from 10–40, and a volatile component of from 8-20% by weight, wherein the grouting composition is present in the joints between the tiles and adhesively attached to the tiles and to the support.

12. The tile assembly of claim 11 wherein the tiles are ceramic tiles.

13. The tile assembly of claim 11 wherein there is included in the grouting composition from 5 to 30 percent by weight of said polymer emulsion of a polyhydric alcohol.

14. The tile assembly of claim 11 wherein said spherical glass is present in a range of about 3 to 8 percent by weight.

15. The tile assembly of claim 11 wherein said polymer is a film-forming, water dispersible, room temperature cross-linkable polymer.

16. The tile assembly of claim 11 wherein the cross-linking of said cross-linkable polymer is aided by the addition of a cross-linking agent.

17. The tile assembly of claim 11 wherein the cross-linking of said cross-linkable polymer is aided by the addition of an acidic catalyst present in an amount to provide from 0.03 to 2.0 percent by weight of the total aqueous composition.

18. A method for setting and grouting tile in an edge-to-edge, spaced-apart relationship on a support surface, said method comprising:
 a. applying to the support surface and into joints between tiles arranged on the support surface in an edge-to-edge, spaced-apart relationship, a grouting composition comprising (i) 2–16 percent by weight of a polymer emulsion capable of coalescing upon the loss of water from the grouting composition and having a solids content of 40–75 percent; and (ii) 50–90 percent by weight of a water insoluble filler in which at least 2% thereof is spherical glass having a particle size range of from about 2 to about 500 microns, said grouting composition having a viscosity of 10,000 to 4,000,000 cps, a water retention value of from 10–40, and a volatile component of from 8–20 percent by weight;

b. washing excess grout composition from the tile surfaces;

c. shaping the joint to the desired contour; and d. wiping the dried grouting composition from the tile surfaces.

19. The method of claim 18 wherein the tiles are ceramic tiles.

20. The method of claim 18 wherein there is included in the grouting composition from 5 to 30 percent by weight of said polymer emulsion of a polyhydric alcohol.

21. The method of claim 18 wherein said spherical glass is present in a range of about 3 to 8 percent by weight.

22. The method of claim 18 wherein said polymer is a film-forming, water dispersible room temperature cross-linkable polymer.

23. The method of claim 18 wherein the crosslinking of said cross-linkable polymer is aided by the addition of a cross-linking agent.

24. The method of claim 18 wherein the crosslinking of said cross-linkable polymer is aided by the addition of an acidic catalyst present in an amount to provide from 0.03 to 2.0 percent by weight of the total aqueous composition.

* * * * *

UNITED STATES PATENT AND TRADEMARK OFFICE
CERTIFICATE OF CORRECTION

PATENT NO. : 3,854,267

DATED : December 17, 1974

INVENTOR(S) : David S. Weiant, William R. Velivis, John V. Fitzgerald

It is certified that error appears in the above-identified patent and that said Letters Patent are hereby corrected as shown below:

In Col. 25, line 32, after "polymer" and before "emulsion", insert: -- in the form of an --.

In Col. 26, line 27, after "polymer" and before "emulsion", insert: -- in the form of an --; on line 68, after "polymer" and before "emulsion", insert: -- in the form of an --.

Signed and Sealed this twenty-eight Day of October 1975

[SEAL]

Attest:

RUTH C. MASON
Attesting Officer

C. MARSHALL DANN
Commissioner of Patents and Trademarks